March 30, 1926.
A. F. MASURY ET AL
1,578,673
CUSHIONED SUPPORT FOR THE UNITS OF MOTOR VEHICLES
Filed June 13, 1921 2 Sheets-Sheet 1
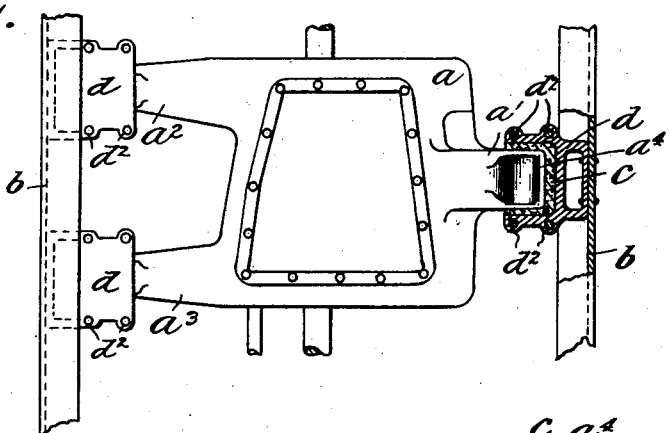
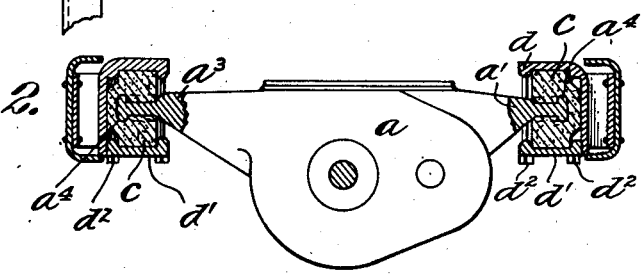

March 30, 1926. 1,578,673
A. F. MASURY ET AL
CUSHIONED SUPPORT FOR THE UNITS OF MOTOR VEHICLES
Filed June 13, 1921 2 Sheets-Sheet 2
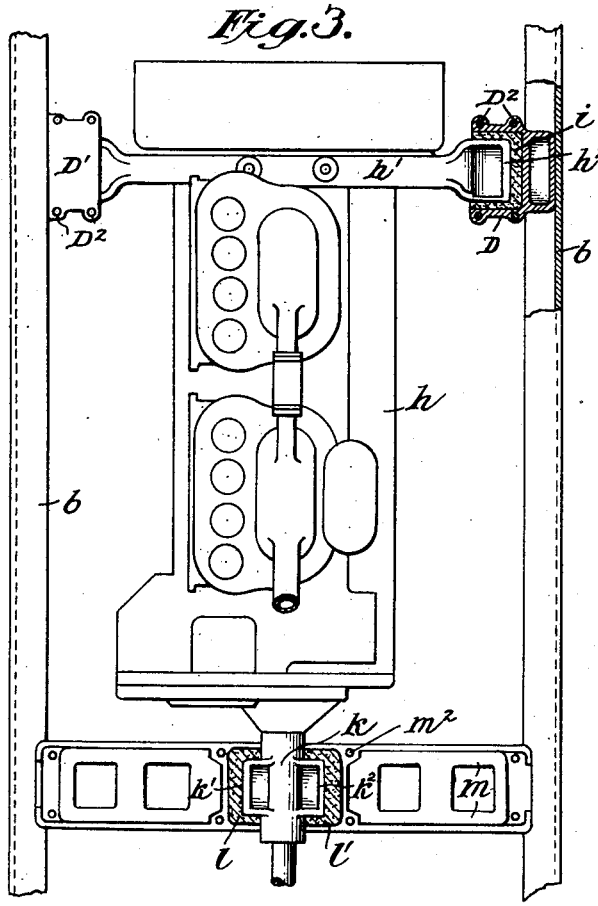
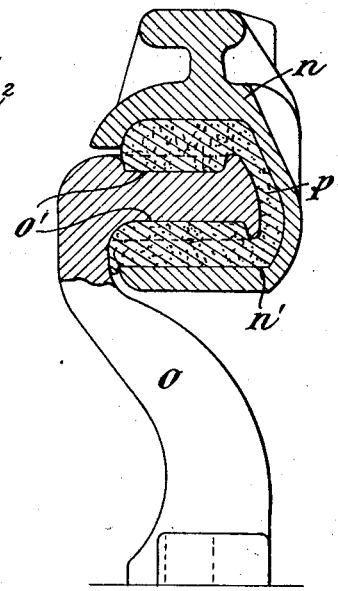
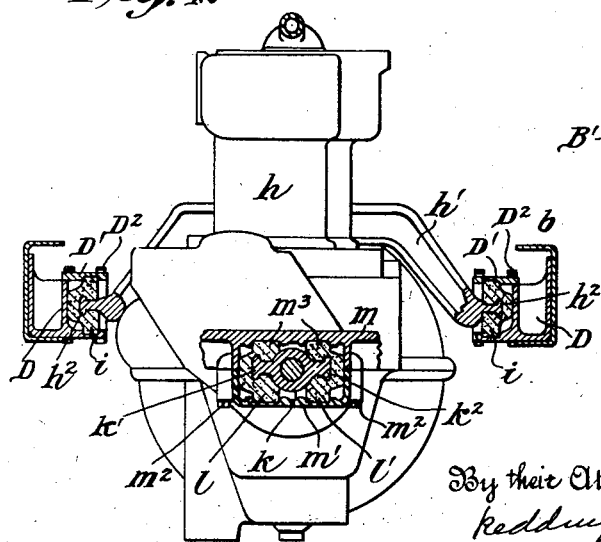
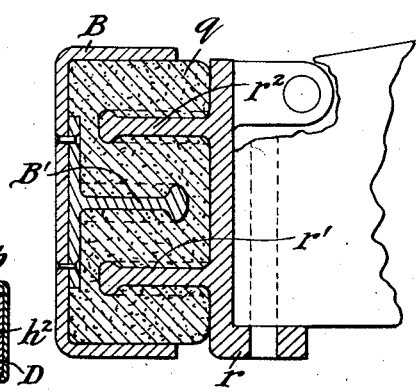
Inventors:
Alfred F. Masury
August H. Leipert
Curt Laurer
By their Attorneys
Redding & Greeley Patented Mar. 30, 1926.

1,578,673

UNITED STATES PATENT OFFICE.

ALFRED F. MASURY, AUGUST H. LEIPERT, AND CURT SAURER, OF NEW YORK, N. Y., ASSIGNORS TO INTERNATIONAL MOTOR COMPANY, OF NEW YORK, N. Y., A CORPORATION OF DELAWARE.

CUSHIONED SUPPORT FOR THE UNITS OF MOTOR VEHICLES.

Application filed June 13, 1921. Serial No. 476,994.

*To all whom it may concern:*

Be it known that we, ALFRED F. MASURY, AUGUST H. LEIPERT, citizens of the United States, and CURT SAURER, a citizen of Switzerland, residing, respectively, in the borough of Manhattan, in the borough of Queens, and in the borough of Manhattan of the city of New York, in the State of New York, have invented certain new and useful Improvements in Cushioned Supports for the Units of Motor Vehicles, of which the following is a specification, reference being had to the accompanying drawings, forming a part hereof.

This invention has for its general object to eliminate metallic connections between the units of motor vehicles and particularly in the support between such units and the vehicle frame. The ordinary disadvantages of metallic connections, in a mechanical sense, are greater in motor vehicle structures by reason of the vibrations and shocks to which such vehicles are constantly subjected by the propelling motor and the road. Not only does this constant vibration tend to crystallize the metal in the connecting joints in a vehicle but the greater road shocks tend to disintegrate it or actually fracture it. Further, the problem of lubrication is admittedly one of the most difficult of solution in motor vehicle practise. There is no satisfactory means to lead a lubricant to every joint in a motor vehicle and even if there were such means, the joint itself would be exposed to gritty foreign deposits. In accordance with the present invention it is proposed to eliminate in so far as possible metallic connections between the units of a motor vehicle and particularly between such units and their supports. In eliminating such metallic connections all of the problems attendant upon lubrication are removed and greater strength is secured. The improved connection is formed by means of a nonmetallic cushioning element, of rubber, cork, fabricated material or other suitable composition having the desired properties. The material may be molded in suitable form for the particular situation in which it is used and then be interposed between units or between the unit to be supported and its support. In each instance there is no metal to metal contact and the composition material gives a nonmetallic cushioned support, which functions satisfactorily without a lubricant.

In the appended drawings several different embodiments of the invention have been illustrated to show the latitude of use in a motor vehicle, but all of these embodiments incorporate the same principle, and it will be understood by one skilled in the art that connections embodying the invention may be employed at still other points not indicated.

In the drawings—

Figure 1 is a view in plan showing conventionally a transmission casing supported at three points on the side frame members of the motor vehicle by the improved cushioned support.

Figure 2 is a view in transverse section through the casing shown in Figure 1 and illustrating suitable housing for the cushioned support.

Figure 3 is a view in plan of a conventional type of motor carried by the improved support.

Figure 4 is a view in transverse section through the cushioned supports for the motor shown in Figure 3.

Figure 5 is a detail view in section showing a different form of support for the front end of a motor.

Figure 6 is a detail view in section showing a slightly modified type of cushioned support for, say, the motor shown in Figure 3.

It will be understood from the preamble to the specification that the invention is not to be limited to the character of the unit supported either as concerns its function or its structure and for that reason all of the units illustrated in the accompanying drawings have been selected to indicate the latitude afforded by the invention rather than to bring out any problem peculiar to their support. For instance, as shown in Figures 1 and 2, the transmission casing $a$ may be carried on the side frame members $b$ of the vehicle at three points in accordance with good practise. Usually, such casings have been cast with one laterally extending leg $a'$ at its mid-section on one side and two laterally extending legs $a^2$, $a^3$ adjacent to the extreme edges of the casing at the other side. These legs may be clamped in any suitable manner to the side frame members b. Weaving of the frame and vibrations and shocks on the parts have tended to loosen the connections and set up unpleasant noises therein. In accordance with the present invention there is no metal to metal in the supporting connection between the transmission casing and the side frame members b but the support is afforded by means of some yielding or cushioning material indicated as blocks c. These blocks may conveniently be molded to embrace the ends of the respective legs $a'$, $a^2$, $a^3$ which may, if desired, be formed with enlargements $a^4$ to hold the blocks against displacement with respect to said legs. The blocks may be clamped under compression within housings $d$ bolted to the side frame members, by removable caps $d'$ held in place by bolts $d^2$. The housings $d$ may have top, end and rear walls and the caps $d'$ may be slightly grooved to clamp the blocks more securely against displacement. In order to permit the transmission casing $a$ to be dropped the caps $d'$ are preferably secured at the undersides of the housings $d$ so that when the bolts $d^2$ are withdrawn the blocks may slide out of the housings.

In Figures 3 and 4 the improved cushioned support has been adapted to a motor $h$ having three points of support on the side frame members. At the rear of the motor the cross I-beam $h'$ has cast at its ends enlarged webs $h^2$ which seat in yielding blocks $i$ carried in housings D on the side frame members $b$. Channel caps D' may be secured detachably on the housings by means of bolts $D^2$. The arrangement of elements at the front end of the motor is slightly different and illustrates a further adaptation of the same principle in motor car practice. As seen most clearly in Figure 5 the motor casing carries therewith a forwardly extending sleeve $k$ which is cast with oppositely extending webs $k'$, $k^2$, enlarged at their ends and seating within separate yielding blocks $l$, $l'$, respectively. Both of these blocks may be seated in the front cross beam $m$ for the motor and be held removably therein by means of a cap $m'$ secured by bolts $m^2$. In this form, the cap $m'$ is slightly channeled to provide seats for the two blocks $l$, $l'$ while the supporting cross beam $m$ may likewise have formed therein complementary channels $m^3$ for both of said blocks.

In Figure 5 there is illustrated in cross section a transverse supporting beam $n$ for the front end of a motor and this beam may be formed with a channel section $n'$ to receive the end of a gooseneck support $o$ for the front of a motor. The end of the support $o$ may be cast with recesses $o'$ in which seat the ends of a split block $p$ of yielding material which, in turn, is seated snugly within the channel $n'$ of the cross beam $n$. The effect in this embodiment is the same as that heretofore described in that metal to metal contact is eliminated and a yielding cushioned connection between the unit and its support is provided.

In Figure 6 there is shown what may be termed a dual supporting block $q$ which is interposed between one of the side channel members B of the vehicle frame and a supporting web $r$ for a unit, such as a motor, to be connected to the frame. The web $r$ has cast thereon flanges $r'$, $r^2$, enlarged at their ends to seat within the split block $q$. The channel member B of the vehicle frame may have secured to its inner web a T-member B' which is likewise embraced by the block $q$. In the preferred arrangement the T-member B' will lie between the flanges $r'$, $r^2$ and extend oppositely thereto. The firm embedding of the flanges $r'$, $r^2$, B' within the yielding material in the manner described and the mass of material interposed between the supporting channel and the connection $r$ will insure the greatest rigidity and strength with maximum springiness.

We claim as our invention:

1. In combination with two frame members and a unit to be supported at two points thereon, rigid supporting means extending from the unit and connected thereto, housings supported by the frame members and open to receive the said supporting means, respectively, non-metallic yielding material disposed within each housing and lying generally in two vertical columns above and below the supporting means to resist yieldingly movements thereof upwardly and downwardly and horizontal columns in the plane of the supporting means to resist movements thereof horizontally, and seats for the material on the supporting means and within the housings to hold it against displacement with respect to the supporting means and housing, respectively.

2. In combination with two frame members and a unit to be supported at two points thereon, rigid supporting means extending from the unit and connected thereto, housings supported by the frame members and open to receive the said supporting means, respectively, non-metallic yielding material disposed within each housing and lying generally in two vertical columns above and below the supporting means to resist yieldingly movements thereof upwardly and downwardly and horizontal columns in the plane of the supporting means to resist movements thereof horizontally, seats for the material on the supporting means and within the housings to hold it against displacement with respect to the supporting means and housing, respectively, and means to confine the material within the housing under compression.

3. In combination with two frame members and a unit to be supported at two points thereon, rigid supporting means extending from the unit and connected thereto, a wholly non-metallic support for said supporting means comprising blocks of non-metallic yielding material having openings in their sides to receive the respective supporting means, said blocks each comprising two vertical columns above and below the supporting means to resist yieldingly movements thereof upwardly and downwardly and horizontal columns in the plane of the supporting means to resist movements thereof horizontally, housings supported by the frame members and adapted to receive the respective blocks and open to receive the said supporting means, respectively, and means to secure the blocks against displacement with respect to the supporting means and housings, respectively.

4. In combination with a plurality of frame members and a unit to be supported at three points thereon, rigid supporting means extending from the unit and connected thereto at three spaced points, two of which are generally disposed at an opposite side of the unit from the third point, housings for each of the supporting means carried by the frame members and open to receive the said supporting means, respectively, non-metallic yielding material disposed within each housing and lying generally in two vertical columns above and below the supporting means to resist yieldingly movements thereof upwardly and downwardly and horizontal columns in the plane of the supporting means to resist movements thereof horizontally, and seats for the material on the supporting means and within the housings to hold it against displacement with respect to the supporting means and housing, respectively.

This specification signed this 10th day of June, A. D. 1921.

ALFRED F. MASURY.
AUGUST H. LEIPERT.
CURT SAURER.